Figure 2:
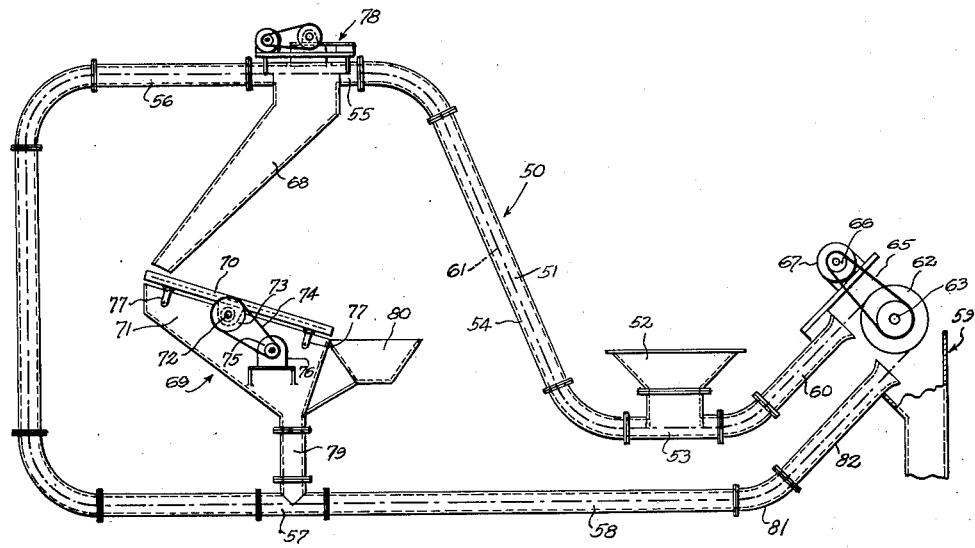

Nov. 4, 1952    H. W. HAPMAN    2,616,438
FLIGHT CONVEYER INSTALLATION
Filed Feb. 24, 1948

INVENTOR.
Henry W. Hapman
BY Barthel + Bugbee
ATTYS

Patented Nov. 4, 1952

2,616,438

UNITED STATES PATENT OFFICE 2,616,438

FLIGHT CONVEYER INSTALLATION

Henry W. Hapman, Detroit, Mich., assignor, by mesne assignments, of forty per cent to Hannah J. Hapman, Detroit, Mich.

Application February 24, 1948, Serial No. 10,265

10 Claims. (Cl. 134—124)

This invention relates to conveyors and in particular to pipe or flight conveyors.

One object of this invention is to provide a flight conveyor system wherein a conveyor is adapted to convey unprocessed material to a processing apparatus and the same conveyor on its return course picks up the processed material and conveys it to a disposal station, thus making a single conveyor accomplish the work ordinarily performed by two separate conveyors.

Another object is to provide a flight conveyor system of the foregoing type which is especially suitable for conveying of wet processed material from the processing machine upward to a disposal station, a portion of the surplus liquid flowing backward into the processing apparatus prior to the arrival of the processed material at the disposal station.

Another object is to provide a flight conveyor system of the foregoing type wherein the conveyor conduit carrying the processed material in a wet state is inclined upward so that it will maintain the same liquid level as exists in the processing apparatus without draining off the liquid from the processing apparatus.

Figure 1:
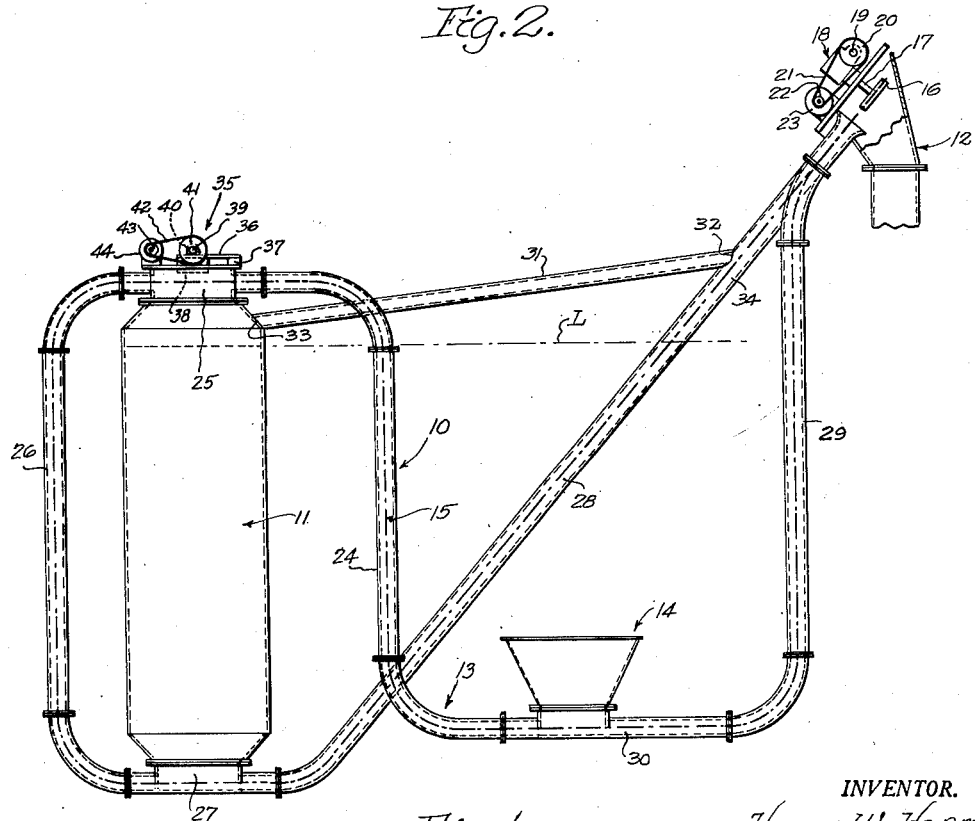

In the drawings:

Figure 1 is a side elevation partly in section of a flight conveyor system adapted to convey unprocessed material to a processing apparatus and to convey the processed material in a wet state away from the processing apparatus to a disposal station, according to a preferred form of the invention; and Figure 2 is a side elevation, partly in section, of a flight conveyor system similar to that shown in Figure 1 but especially suitable for conveying dry materials.

Conveyor systems for carrying materials to and from a processing apparatus, such as a wet classifier, dry sifter, or other analogous machines, ordinarily employ at least two separate conveyors, one for conveying the unprocessed material from the loading station to the processing apparatus and a second conveyor for conveying the processed material from the processing apparatus to a disposal station. This arrangement requires a considerable amount of equipment and consumes much power.

The present invention provides a conveyor system wherein a conveyor carries the unprocessed material to the processing apparatus and the same conveyor on its return course carries the processed material away from the processing apparatus to a disposal station. If the processed material is wet, the conveyor conduit is inclined upward from the processing apparatus to the disposal station and, preferably, an inclined liquid return line is provided to carry the liquid draining out of the material prior to its reaching the disposal station and returning it to the processing apparatus, thereby preventing pumping. In this manner, a single conveyor does double duty, reducing the initial cost of the installation and also the upkeep expense. At the same time, the arrangement of the conveyor is such as to maintain the liquid level in the processing apparatus, such as a wet classifier. The same conveyor system is also adapted to handle dry materials, conveying the unprocessed dry material to the processing apparatus, such as a sifting machine, and on its return course, conveying the processed material to a disposal station.

Referring to the drawings in detail, Figure 1 shows a conveyor system generally designated 10 adapted to convey material for wet processing to a processing apparatus, generally designated 11, and to pick up the wet processed material on its return course and convey it upward to a disposal station 12. The conveyor system 10 includes a conduit 13 having a loading hopper or charging station 14 from which a flight conveyor chain shown diagrammatically by the dotted line 15 traverses the conveyor conduit 13 throughout its various courses. The flight conveyor chain 15 is driven by a sprocket 16 shown at the upper right-hand corner of Figure 1, the sprocket 16 being mounted on the output shaft 17 of a reduction gear set 18 having an input shaft and pulley 19 and 20 respectively driven by an endless belt or sprocket chain 21 from a pulley 22 on the armature shaft of an electric motor 23.

The flight conveyor chain 15 may be of any suitable type such as the type shown in my copending application Serial Number 676,546 filed June 13, 1946 for Flight Conveyor.

Such a conveyor preferably has flight discs of elastic deformable material, such as rubber or synthetic rubber, operating in a metal pipe preferably in the presence of liquid such as water which lubricates the edges of the flight discs and results in an easy flow of material and a minimum expenditure of power.

The flight conveyor conduit 13 is disposed approximately in the form or shape of a figure eight lying on its side, and may be considered in several separate portions according to the nature of the work done in each portion. The unprocessed material feeding portion 24 extends from the loading station or hopper 14 to the inlet portion 25 at the top of the processing apparatus 11. From the top of the latter, the conduit portion 26 descends to the outlet portion 27 at the bottom of the processing apparatus 11 and from thence the discharge or ascending conduit portion 28 proceeds upward to the discharge station 12. The now empty flight conveyor chain 15 returns through the return conduit portion 29 to the supply or loading conduit portion 30 immediately beneath the loading hopper or station 14.

In the event that the processed material is in a wet condition, let it be assumed that a liquid level L is maintained in the apparatus 11 and consequently rises to the same level in the conduit portion 28. When the material is conveyed in the conduit portion 28 above the liquid level L, the liquid tends to flow downward and a liquid return or drain conduit 31 runs from the port 32 in the conduit portion 28 to the port 33 in the top of the processing apparatus 11. Thus, the portion of the conduit 28 above the liquid level L and designated by the reference numeral 34 serves as a liquid removing or draining portion or, in the case of materials containing water, as a de-watering zone. The upper ends of the conduit portions 28 and 29 are preferably bell-mouthed or flared in order to facilitate passage of the flight conveyor chain 15 and to further reduce the pumping effect.

The material inlet portion 25 of the conveyor system 10 may be provided with a conveyor vibrator generally designated 35 for the purpose of forcibly dislodging material from the flight conveyor chain 15 as it passes through the inlet portion 25 into the descending portion 26. The vibrator 35 forms no part of the present invention and its details are disclosed and claimed in my copending application, Serial Number 705,942 filed October 26, 1946, for Material Removing Device for Conveyors.

For the purposes of the present invention, however, it may be stated that the conveyor vibrator 35 consists of a spring arm 36 resembling a springboard secured at its outer end to a support 37 and at its inner or free end carrying a striker or hammer 38. A shaft 39 journaled as at 40 on the arm 36 carries one or more eccentric weights (not shown) which are rotated by the pulley 41 on the shaft 39, the pulley 41 in turn being driven by a belt 42 from the pulley 43 mounted on the armature shaft of the electric motor 44. Thus, when the motor 44 rotates the shaft 39 and its eccentrics, the latter caused the spring arm 36 and the striker 38 to move up and down, intermittently hitting the flight conveyor chain 15 and knocking off the particles of material adhering to it.

The operation of the conveyor system shown in Figure 1 has been described in part in connection with its construction. The material to be processed is loaded into the hopper 14 from the bottom portion 30 of which it is carried upward through the conveyor conduit portion 24 by the flight conveyor chain 15 into the inlet conduit portion 25, where it is discharged into the processing apparatus 11. The material falls downward within the apparatus 11 while being processed and settles into the outlet portion 27 thereof. Meanwhile, the empty flight conveyor chain 15, freed of its particles of material by the vibrator 35 proceeds downward through the descending conduit portion 26 to the outlet portion 27. As it passes through this portion into the ascending portion 27 it picks up the processed material and carries it upward through the ascending portion 28.

When the conveyed material passes above the liquid level L, the liquid starts running backward through the space between the conveyor flights and the conduit, a clearance therebetween being preferably provided for that purpose. Surplus liquid escapes through the port 32 into the inclined drain conduit 31 and discharges into the processing apparatus 11 through the port 33. The material, thus freed from its surplus liquid, is discharged out of the upper end of the ascending conduit portion 28 into the discharge station 12 from whence it passes downward for further transportation or use.

The modified conveyor system generally designated 50 shown in Figure 2 is generally similar to the conveyor system 10 shown in Figure 1, except that the conveyor system 50 is especially adapted to the conveying of dry processed and unprocessed materials. For this purpose, the conveyor system 50 includes the conduit 51 associated with the loading station or hopper 52 which empties into a supply conduit portion 53. Extending upward from the supply conduit portion 53 is the unprocessed material conduit portion 54 which discharges into the conduit portion 55. From the conduit portion 55 the descending conduit portion 56 passes downward to the outlet portion 57 whence the discharge conduit 58 leads upward to the discharge station 59. From the discharge station 59, the conduit portion 60 descends to the supply portion 53. The conduit 51 consisting of the foregoing portions contains the flight conveyor chain 61 which passes around and is driven by the sprocket 62 on the shaft 63. The latter is driven by the pulley 64 from the belt 65 driven by the pulley 66 on the armature shaft of the motor 67.

The unprocessed material discharged from the conduit portion 55 passes downward through the hopper or spout 68 and reaches the processing apparatus 69. The latter may include an oscillating screen or sifter 70 reciprocably mounted above a hopper 71 and oscillated by an eccentric (not shown) mounted on a shaft 72 which in turn is driven by a pulley 73 from a belt 74 which is in turn driven by the armature shaft pulley 75 of the electric motor 76. The screen or sifter 70 is optionally mounted upon swinging parallel links 77. The sifted material passes downward through the hopper 71 and processed material discharge conduit 79 into the outlet portion 57 where it is picked up by the now empty flight conveyor chain 61 which has meanwhile descended through the conduit portion 56. The conveyor chain 61 conveys the processed material, which is preferably in a substantially dry condition, through the discharge conduit portion 58 and upward to the discharge station 59. From this point the conveyor chain 61 passes around the drive sprocket 62 and returns to the supply portion 53 through the conduit portion 60. A vibrator 78 is optionally provided at that location above the conduit portion 55. The vibrator 78 is similar to the vibrator 35 and performs the same function. A receptacle 80, such as a hopper or chute, is provided to receive the over-sized particles of material which are not passed by the screen 70 and which therefore roll downward off the screen.

The operation of the modification shown in Figure 2 has been described sufficiently above in connection with the construction thereof, hence no further description is necessary. During operation, the bend 81 (Figure 2) in the conduit portion 58 becomes completely filled with the processed material and therefore serves as a trap to prevent dust from passing through and out of the inclined portion 82 of the conduit portion 58.

What I claim is:

1. A flight conveyor installation for serving a material-processing apparatus having an unprocessed material inlet portion and a processed material outlet portion, said installation comprising an unprocessed material loading station, a processed material unloading station, a conveyor conduit system disposed approximately in the form of a figure eight having upwardly-directed conduit portions crossing one another including a supply conduit portion extending from said loading station to said inlet portion and having an outlet positioned to discharge conveyed material into said apparatus inlet portion, an intermediate portion extending from said inlet portion to said outlet portion, a discharge portion having an inlet positioned to receive processed material from said apparatus outlet portion and extending from said outlet portion to said unloading station, said discharge portion having an outlet positioned to discharge processed material at said unloading station, and a return portion extending from said unloading station to said loading station; an endless flight conveyor arranged within said conduit system and traversing said portions, and conveyor driving mechanism operatively engaging said conveyor.

2. A flight conveyor installation for serving a material-processing apparatus having an unprocessed material inlet portion and a processed material outlet portion, said installation comprising an unprocessed material loading station, a processed material unloading station, a conveyor conduit system disposed approximately in the form of a figure eight having upwardly-directed conduit portions crossing one another including a supply conduit portion extending from said loading station to said inlet portion and having an oulet positioned to discharge conveyed material into said apparatus inlet portion, an intermediate portion extending from said inlet portion to said outlet portion, a discharge portion having an inlet positioned to receive processed material from said apparatus outlet portion and extending from said outlet portion to said unloading station, said discharge portion having an outlet positioned to discharge processed material at said unloading station, and a return portion extending from said unloading station to said loading station; and endless flight conveyor arranged within said conduit system and traversing said portions, and conveyor driving mechanism operatively engaging said conveyor, said inlet portion and said outlet portion being arranged respectively above and below said processing apparatus.

3. A flight conveyor installation for serving a material-processing apparatus having an unprocessed material inlet portion and a processed material outlet portion, said installation comprising an unprocessed material loading station, a processed material unloading station, a conveyor conduit system disposed approximately in the form of a figure eight having upwardly-directed conduit portions crossing one another including a supply conduit portion extending from said loading station to said inlet portion and having an outlet positioned to discharge conveyed material into said apparatus inlet portion, an intermediate portion extending from said inlet portion to said outlet portion, a discharge portion having an inlet positioned to receive processed material from said apparatus outlet portion and extending from said outlet portion to said unloading station, said discharge portion having an outlet positioned to discharge processed material at said unloading station, and a return portion extending from said unloading station to said loading station; an endless flight conveyor arranged within said conduit system and traversing said portions, and conveyor driving mechanism operatively engaging said conveyor, said discharge portion of said conduit system being directed upwardly toward said unloading station from a level below said unloading station.

4. A flight conveyor installation for serving a material-processing apparatus having an unprocessed material inlet portion and a processed material outlet portion, said installation comprising an unprocessed material loading station, a processed material unloading station, a conveyor conduit system disposed approximately in the form of a figure eight having upwardly-directed conduit portions crossing one another including a supply conduit portion extending from said loading station to said inlet portion, an intermediate portion extending from said inlet portion to said outlet portion, a discharge portion extending from said outlet portion to said unloading station, and a return portion extending from said unloading station to said loading station; an endless flight conveyor arranged within said conduit system and traversing said portions, and conveyor driving mechanism operatively engaging said conveyor, said processing apparatus having a predetermined liquid level therein, and said conveyor system discharge portion extending upwardly to a level above said liquid level.

5. A flight conveyor installation for serving a material-processing apparatus having an unprocessed material inlet portion and a processed material outlet portion, said installation comprising an unprocessed material loading station, a processed material unloading station, a conveyor conduit system disposed approximately in the form of a figure eight having upwardly-directed conduit portions crossing one another including a supply conduit portion extending from said loading station to said inlet portion, an intermediate portion extending from said inlet portion to said outlet portion, a discharge portion extending from said outlet portion to said unloading station, and a return portion extending from said unloading station to said loading station; an endless flight conveyor arranged within said conduit system and traversing said portions, conveyor driving mechanism operatively engaging said conveyor, said processing apparatus having a predetermined liquid level therein, and said conveyor system discharge portion extending upwardly to a level above said liquid level, and a downwardly-extending liquid drain conduit connected to said discharge portion at a location above said liquid level.

6. A flight conveyor installation for serving a material-processing apparatus having an unprocessed material inlet portion and a processed material outlet portion, said installation comprising an unprocessed material loading station, a processed material unloading station, a conveyor conduit system disposed approximately in the form of a figure eight having upwardly-directed conduit portions crossing one another including a supply conduit portion extending from said loading station to said inlet portion, an intermediate portion extending from said inlet portion to said outlet portion, a discharge portion extending from said outlet portion to said unloading station, and a return portion extending from said unloading station to said loading station; an endless flight conveyor arranged within said conduit system and traversing said portions, conveyor driving mechanism operatively engaging said conveyor, said processing apparatus having a predetermined liquid level therein, and said conveyor system discharge portion extending upwardly to a level above said liquid level, and a liquid drain conduit extending from said discharge portion above said liquid level downward into communication with said processing apparatus.

7. A flight conveyor installation for serving a material-processing apparatus having an unprocessed material inlet portion and a processed material outlet portion, said installation comprising an unprocessed material loading station, a processed material unloading station, a conveyor conduit system disposed approximately in the form of a figure eight having upwardly-directed conduit portions crossing one another including a supply conduit portion extending from said loading station to said inlet portion, an intermediate portion extending from said inlet portion to said outlet portion, a discharge portion extending from said outlet portion to said unloading station, and a return portion extending from said unloading station to said loading station; and endless flight conveyor arranged within said conduit system and traversing said portions, and conveyor driving mechanism operatively engaging said conveyor, said processing apparatus having a predetermined liquid level therein, and said conveyor system discharge portion extending upwardly to a level above said liquid level, said unloading station being disposed on a level above said outlet portion.

8. A flight conveyor installation for serving a material-processing apparatus having an unprocessed material inlet portion and a processed material outlet portion, said installation comprising an unprocessed material loading station, a processed material unloading station, a conveyor conduit system disposed approximately in the form of a figure eight having upwardly-directed conduit portions crossing one another including a supply conduit portion extending from said loading station to said inlet portion, an intermediate portion extending from said inlet portion to said outlet portion, a discharge portion extending from said outlet portion to said unloading station, and a return portion extending from said unloading station to said loading station; an endless flight conveyor arranged within said conduit system and traversing said portions, and conveyor driving mechanism operatively engaging said conveyor, said processing apparatus having a predetermined liquid level therein, and said conveyor system discharge portion extending upwardly to a level above said liquid level, said unloading station being disposed on a level above said liquid level.

9. A flight conveyor installation for serving a material-processing apparatus having an unprocessed material inlet portion and a processed material outlet portion, said installation comprising an unprocessed material loading station, a material unloading station, a conveyor conduit system disposed approximately in the form of a figure eight having upwardly-directed conduit portions crossing one another including a supply conduit portion extending from said loading station to said inlet portion, an intermediate portion extending from said inlet portion to said outlet portion, a discharge portion extending from said outlet portion to said unloading station, and a return portion extending from said unloading station to said loading station; an endless flight conveyor arranged within said conduit system and traversing said portions, conveyor driving mechanism operatively engaging said conveyor, said processing apparatus having a predetermined liquid level therein, and said conveyor system discharge portion extending upwardly to a level above said liquid level, and a downwardly-extending liquid drain conduit connected to said discharge portion at a location above said liquid level, said unloading station being disposed on a level above said liquid level.

10. A flight conveyor installation for serving a material-processing apparatus having an unprocessed material inlet portion and a processed material outlet portion, said installation comprising an unprocessed material loading station, processed material unloading station, a conveyor conduit system disposed approximately in the form of a figure eight having upwardly-directed conduit portions crossing one another including a supply conduit portion extending from said loading station to said inlet portion, an intermediate portion extending from said inlet portion to said outlet portion, a discharge portion extending from said outlet portion to said unloading station, and a return portion extending from said unloading station to said loading station; an endless flight conveyor arranged within said conduit system and traversing said portions, conveyor driving mechanism operatively engaging said conveyor, said processing apparatus having a predetermined liquid level therein, and said conveyor system discharge portion extending upwardly to a level above said liquid level, and a liquid drain conduit extending from said discharge portion above said liquid level downward into communication with said processing apparatus, said unloading station being disposed on a level above said liquid level.

HENRY W. HAPMAN.

REFERENCES CITED

The following references are of record in the

UNITED STATES PATENTS

| Number | Name | Date |
|---|---|---|
| 1,495,450 | Smith | May 27, 1924 |
| 2,130,492 | Hapman | Sept. 20, 1938 |
| 2,432,756 | Hapman | Dec. 16, 1947 |